United States Patent
Rahman et al.

[19]

[11] Patent Number: 6,036,090
[45] Date of Patent: Mar. 14, 2000

[54] AUTOMATED PREPAYMENT METHOD FOR MOBILE TERMINALS

[75] Inventors: Tariq Rahman, Spånga; Laurence McDonald, Uppsala, both of Sweden

[73] Assignee: Telefonaktiebolaget LM Ericsson, Stockholm, Sweden

[21] Appl. No.: 08/896,016

[22] Filed: Jul. 17, 1997

[51] Int. Cl.⁷ .................................................. G06K 5/00
[52] U.S. Cl. ........................ 235/380; 235/382; 455/407
[58] Field of Search ................................. 455/406, 407, 455/408, 409; 235/380, 381, 382.5, 375, 382

[56] References Cited

U.S. PATENT DOCUMENTS

| | | | |
|---|---|---|---|
| 4,757,186 | 7/1988 | Herbele et al. | 235/380 |
| 4,782,217 | 11/1988 | Soza et al. | 235/380 |
| 4,831,647 | 5/1989 | D'Avello et al. | 379/91 |
| 4,845,740 | 7/1989 | Tokuyama et al. | 379/91 |
| 5,359,182 | 10/1994 | Schilling | 235/380 |
| 5,384,825 | 1/1995 | Dillard et al. | 379/59 |
| 5,463,671 | 10/1995 | Marsh et al. | 379/56 |
| 5,561,705 | 10/1996 | Allard et al. | 379/58 |
| 5,577,100 | 11/1996 | Mcgregor et al. | 379/58 |
| 5,625,669 | 4/1997 | Mcgregor et al. | 379/58 |
| 5,722,067 | 2/1998 | Fougnies et al. | 455/406 |
| 5,819,178 | 10/1998 | Cropper | 455/433 |

FOREIGN PATENT DOCUMENTS

| | | |
|---|---|---|
| 698987 | 2/1996 | European Pat. Off. . |
| 781064 | 6/1997 | European Pat. Off. . |
| 08047026 | 2/1996 | Japan . |
| WO96/31971 | 10/1996 | WIPO . |

*Primary Examiner*—Donald Hajec
*Assistant Examiner*—Daniel St. Cyr
*Attorney, Agent, or Firm*—Burns, Doane, Swecker & Mathis, L.L.P.

[57] ABSTRACT

An automated prepayment method for accessing wireless telecommunication services by a mobile terminal is disclosed. The method includes programming and storing in the mobile terminal subscriber credit information such as credit or debit card number, authorization PIN code, and the amount of prepayment credit to be bought. A registration request is sent containing a prepayment request indicator to the mobile switching center. The mobile switching center then requests that the mobile terminal transmit the programmed credit information. The credit information is sent to a prepayment clearing house to verify that the subscriber credit is satisfactory. If the response from the clearing house is positive then the mobile switching center grants the mobile terminal access to the network through standard registration procedures. On the other hand, if the subscriber's credit is not satisfactory then access to the network is denied and a corresponding message is displayed on the mobile terminal.

29 Claims, 2 Drawing Sheets

AUTOMATED PREPAYMENT METHOD FOR MOBILE TERMINALS

FIELD OF THE INVENTION

The present invention relates generally to payment methods for mobile telephony services, and pertains more specifically to an automated prepayment method suitable for situations where prepayment access to wireless services is desired.

BACKGROUND OF THE INVENTION

The sharp increase in demand over the years for wireless services highlights a growing trend of general acceptance for this mode of communication. At the present time, customers obtain cellular service by subscribing with a service provider in their home service area. The home service area is a geographic area in which the subscriber anticipates making the majority of his/her calls, usually at a lower tariff rate. As wireless communication becomes more prevalent in society, an important aspect that will determine its general acceptance as a universal communication tool is the ability for subscribers to access services anywhere anytime.

Presently in some countries, there exists a mishmash of cellular systems operating in accordance with different standards, each of which being incompatible with each other. Further complicating the situation is that each of the service providers operate independently with an interest in serving its subscribers in its coverage area. Subscribers wishing to access services outside their home area may be restricted from doing so since access may ultimately depend on whether their provider has a roaming agreement with the visiting provider. This is especially the case in the United States where there exists a patchwork of independently operating systems that are not all linked by roaming agreements.

In situations where roaming agreements do not exist between providers, visiting subscribers must presently carry out a somewhat tedious and manual process in order to obtain service in the visiting area. In many situations, a visiting customer may go through, among other things, a credit check in a process that may be similar to signing up a new customer. Another method that is sometimes used by roaming subscribers typically requires the visiting subscriber to call a toll free number to register for service and/or provide immediate payment. This often requires the subscriber to manually enter a lengthy credit card number on his or her mobile terminal which is then verified for credit worthiness before service is allowed These methods often turn out to be lengthy and inconvenient to customers that desire quick access to services.

In view of the foregoing, it is an objective of the present invention to provide a streamlined and automated prepayment method for roaming subscribers to access wireless telecommunication services that is relatively quick and convenient.

SUMMARY OF THE INVENTION

Briefly described, and in accordance with an embodiment thereof, the invention discloses a method of prepayment access to wireless telecommunication services by mobile terminals. The method includes programming and storing in the mobile terminal subscriber credit information such as credit card or debit card number, authorization PIN code, and the amount of prepayment credit to be bought, for example. The mobile terminal initially requests access to the wireless telecommunication network by sending a standard registration request with an indication in the registration message that this is a prepayment request. The mobile switching center (MSC) determines that the mobile is a visitor and allocates a record in its visitor location registry (VLR). The MSC then issues a request for the mobile terminal to transmit the stored subscriber credit information. The credit information is received and sent on by the MSC to a prepayment clearing house such as a credit card authorization center. The clearing house then sends to the MSC a response as to whether the requested amount is allowed. If the charge is allowed then access is granted by the network to the subscriber. If the charge is denied the subscriber is denied access to the network and a message is displayed on the mobile terminal.

The present invention provides a convenient method of prepaying for wireless services for mobile subscribers that is automated, efficient and less cumbersome than previous prepayment methods. These and other advantages of the present invention will become apparent upon reading the following detailed descriptions and studying the various figures of the drawings.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE PREFERRED EMBODIMENTS

In a basic cellular telecommunication system, a mobile switching center (MSC) is linked to a plurality of base stations by a series of digital transmission links. The base stations are geographically dispersed to form an area of coverage for the system. Each base station (BS) is designated to cover a specified area, known as a cell, in which two way radio communication can take place between a mobile terminal (MT) and the BS in the associated cell. A description of an automated prepayment system operating in accordance with the present invention follows.

In telecommunication systems operating in accordance with Digital Advanced Mobile Phone System (D-AMPS), for example, calls initiated from an MT undergo a procedure referred to as "registration" when the MT is first switched on. Registration is a process by which the MSC uses to keep track of MTs active in its service area. In the case of a roaming MT switched on in a visiting service area, the visiting MSC can determine from the electronic serial number (ESN), unique to each MT and transmitted over a control channel, that it is a visiting MT and therefore can initiate the appropriate registration procedure. The control channel provides the necessary communication and signaling between the MT and the MSC when the MT is not in conversation. Furthermore, an important use of the control channel is to facilitate paging and access to the MSC from an associated cell.

Typically when a visiting MT is detected by the MSC, the ESN is logged into a visitor location register (VLR). The MSC then requests a subscriber's profile from the home location register (HLR) of the subscriber's home service provider, by signaling through the widely used signaling system No. 7 or SS7 network, to obtain information on the subscriber. The requesting MSC uses the information obtained from the HLR to determine whether service should be granted to the visiting subscriber. If the subscriber's service provider has a roaming agreement with the visiting provider access is automatically allowed at a tariff rate that is usually higher than would it otherwise be in his/her home area.

Figure 1:
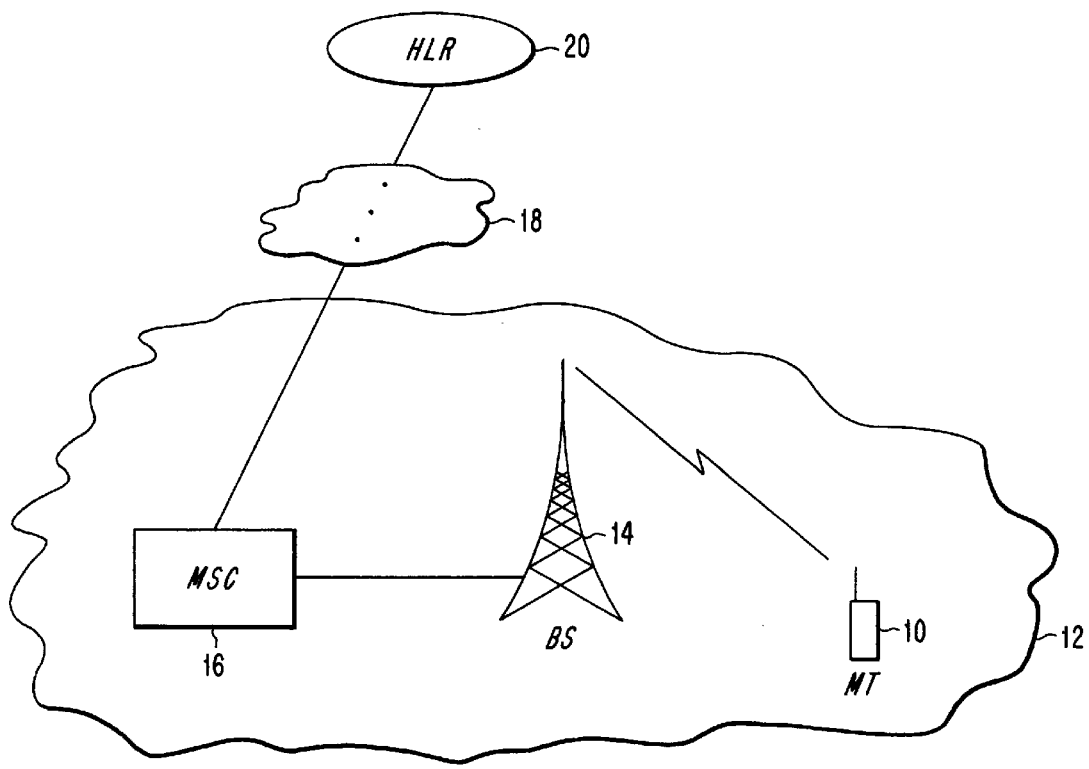
FIG. 1 depicts a typical registration process for a roaming mobile terminal.

FIG. 1 illustrates a typical registration process for a roaming MT requesting access to a visitor network when there is an existing roaming agreement. When MT 10 is switched on for the first time in visitor service area 12 it immediately starts scanning for a control channel emitted from the nearest base station, e.g. BS 14. MT 10 then commences to initiate a registration procedure with MSC 16 who then determines that the MT is not a local subscriber typically by searching through predetermined look-up tables. MSC 16 then requests the subscriber profile information from an HLR 20 belonging to the home service provider of MT 10 through the SS7 network 18.

The SS7 network 18 is a global standard for telecommunications defined by the International Telecommunications Union (ITU) that specifies protocols by which elements in the public switched telephone network (PSTN) send information over a digital signaling network for call setup, routing and control. The network is made up of a plurality of signaling nodes such as service switching points, signal transfer points, and service control points each interconnected by 56 or 64 kilobits per second bidirectional channels (or digital signaling links) for exchanging messages. One principal function for the SS7 network 18 in mobile to mobile calls is to determine the availability of the called party mobile prior to allocation of a voice channel.

The HLR 20 then returns relevant subscriber information through the SS7 network 18 to MSC 16. Such subscriber information may include payment history, service plan features etc. which are used by the visiting service provider to decide whether to grant access, and if so, what service features to provide the subscriber. An access charge is typically levied for using the visiting network and is paid by the subscriber through normal billing by the home provider. The foregoing is a description of an exemplary procedure for subscriber access to a visiting telecommunication network when there is a prearranged roaming agreement among the parties. The following is a discussion of service access using a prepayment method in the case that there is no roaming agreement.

Figure 2:
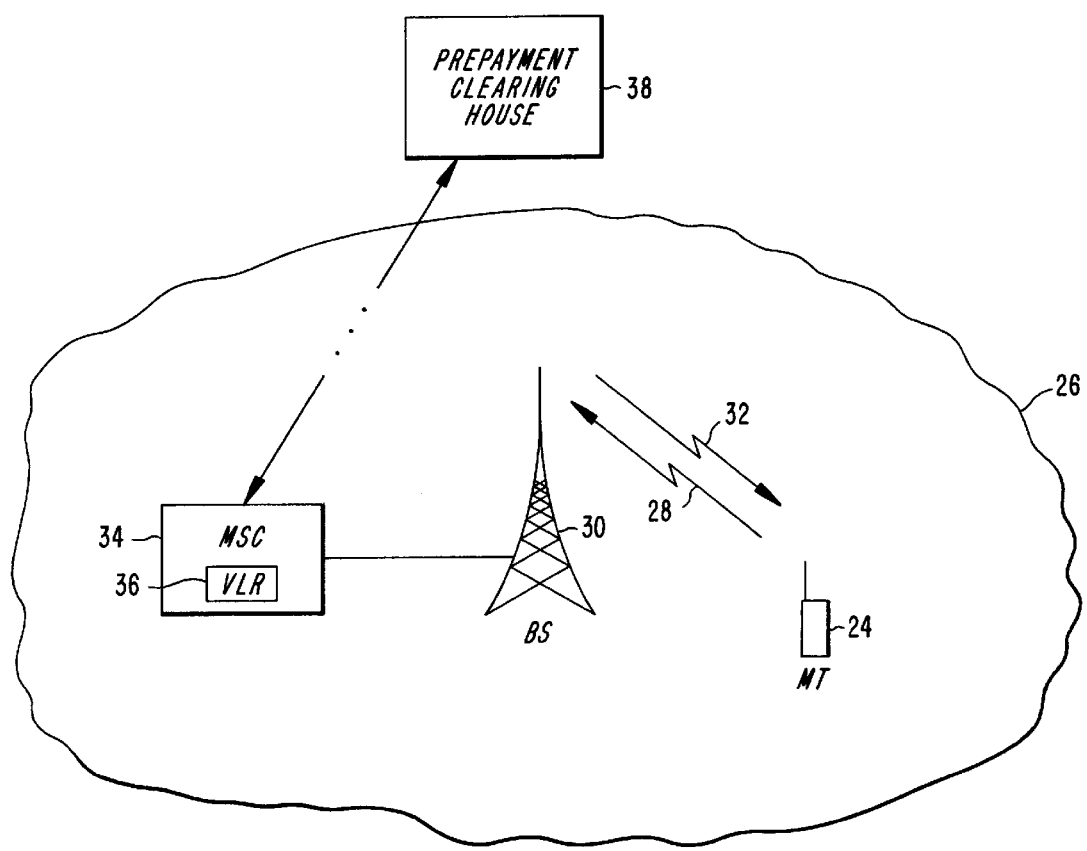
FIG. 2 illustrates a prepayment mechanism operating in accordance with an embodiment of the present invention.

FIG. 2 illustrates a control channel based prepayment system operating in accordance with an embodiment of the present invention. In this implementation, prepayment activity is initiated by setting MT 24 to "prepayment" mode. In this one-time procedure, the subscriber programs into the MT relevant prepayment data needed for any future prepayment access. The programming may include entering a credit card or debit card number, authorization PIN code, and the amount of prepayment credit to be bought. Other data may be entered such as information indicating the subscriber's intended use for the prepayment credit. For example, the subscriber may program a number of options such as prepayment access on when trying to access services in a visiting area. This option permits the subscriber to pay for services in his/her home service area through normal billing methods and thus allowing prepayment credit to be used for paying for access in visiting areas. Other options include allowing for prepayment for access in visiting and home service areas or permitting only prepayment in the home service area. The latter option may be used, for example, in situations where service providers require all customers to prepay before granting service. The programmed information is stored in a memory in MT 24 until it is retrieved by a signaled request. Additionally, the prepayment information may be transmitted through wireless means instead of the normal means of entering data through the number pad. By way of example, the data may be entered into the receiving MT through another phone via the PSTN (or another MT) in which the data is transmitted through the air via a base station to the receiving MT.

When the terminal is initially switched on, MT 24 listens for a control channel and sends out a registration request for service access through standard control channel procedures. In systems operating in accordance with Digital Advanced Mobile Phone System (D-AMPS), for example, a registration request message is sent on the uplink 28 by the MT 24 via BS 30 over a digital control channel. However, the registration request message includes an indicator to alert MSC 34 that this is a prepaid access request. Thus a new control channel message containing the "Prepayment Request" indicator is implemented for use with the system in operation. Upon receipt of the prepayment registration request, MSC 34 allocates a prepayment subscriber record in VLR 36, provided one does not already exist from a previous prepayment registration attempt. The VLR 36 then requests on the downlink 32 for the previously programmed prepayment data from MT 24. MT 24 immediately responds by transmitting on the uplink 28 the prepayment data through another newly defined control message "Prepayment Acknowledge."

The MSC 34 transmits an authorization request containing the subscriber's credit information which includes the credit card number, the amount to be bought, and optional PIN code to a prepayment clearing house 38. The clearing house 38 may be a standard credit card authorization entity having the ability to verify the subscriber's credit limit, financial status etc. The response from the clearing house 38 to accept or deny the charge is received by MSC 34 and processed accordingly. If the charge was accepted then registration and access is granted by VLR 36 to MT 24 through the normal process. If the charge was denied then the registration is denied to the subscriber and a message indicating such may be displayed on MT 24. Subsequent management of subscriber call charges would proceed according to standard prepayment methods used in the art for prepayment. By way of example, in a typical prepayment procedure amassed credit in an account is continuously depleted in accordance with the time used by the subscriber and applied tariff rate. Service is discontinued when the amount of credit reaches zero with either signal or voice warnings of low credit for 10 or 5 minutes of remaining access time, for example.

The present invention contemplates a method for an automated control channel based prepayment mechanism that provides a more convenient way to access services that are especially suited for roaming subscribers or any situation where prepayment access is desired. As described, such a system is suitable for use with various existing wireless telecommunication systems and standards with relatively minor modifications to existing signaling control messages. Another advantage is the increased versatility and usefulness of the mobile terminal to the user. For example, the prepayment capable mobile terminal, such as MT 24, may be used to access service in visiting or home service areas, as depicted in area 26. In addition to the roaming scenario, when in the home service area the subscriber may desire to access service from a competing provider if it offers a lower tariff or simply want to access to its home provider through prepayment means.

While the invention has been described with reference to a specific embodiment, the description is illustrative of the invention and is not to be construed as limiting to tie invention. In particular, the concept may be employed for used with various wireless systems operating in accordance with, for example, Code Division Multiple Access (CDMA), Global System for Mobile Communication (GSM), or Personal Digital Cellular (PDC) in addition to analog systems operating in accordance with Advanced Mobile Phone System (AMPS), Total Access Communication System (TACS), and Nordic Mobile Telecommunication (NMT). Furthermore, phones capable of multi-band and/or multi-standard operation will have access to a greater number of service providers than single-band or single-standard phones thereby increasing the usefulness and convenience to the subscriber. The subscriber will have a wider choice among competing providers regarding price and service. Therefore, various modifications and applications may occur to those skilled in the art without departing from the true spirit and scope of the invention as defined by the appended claims.

What is claimed is:

1. A method of prepaying for wireless telecommunication services comprising the steps of:
    programming a mobile terminal with subscriber credit information;
    requesting access to said wireless telecommunication services by said mobile terminal;
    selectively transmitting said credit information from said mobile terminal via a system provider to a credit authorization entity when an identity of said system provider is a visiting service system provider; and
    accessing said wireless telecommunication service by said mobile terminal when a response from said credit authorization entity is positive, and wherein when said response is negative service is denied to said mobile terminal.

2. A method according to claim 1 wherein said programming step includes entering data from any one of credit card number, debit card number, authorization PIN code, and prepayment amount.

3. A method according to claim 1 wherein said requesting access step occurs over a digital control channel.

4. A method according to claim 1 wherein said accessing step proceeds in accordance with registration procedures defined in the Digital Advanced Mobile Phone System (D-AMPS) standard.

5. A method according to claim 1 wherein said accessing step proceeds in accordance with registration procedures defined in the Advanced Mobile Phone System (AMPS) standard.

6. A method according to claim 1 wherein said accessing step proceeds in accordance with registration procedures defined in the Code Division Multiple Access (CDMA) standard.

7. A method according to claim 1 wherein said accessing step proceeds in accordance with registration procedures defined in the Global System for Mobile Communication (GSM) standard.

8. A method according to claim 1 wherein said accessing step proceeds in accordance with registration procedures defined in the Personal Digital Cellular (PDC) standard.

9. A method according to claim 1 wherein said prepayment method works collectively in accordance with any one of Advanced Mobile Phone System (AMPS), Total Access Communication System (TACS), and Nordic Mobile Telecommunication System (NMT).

10. The method of claim 1, further comprising the step of:
    providing a user interface to said mobile terminal that permits a user to select prepaid access for home service area accesses, visiting service area accesses, or both.

11. The method of claim 10, wherein said step of selectively transmitting further comprises the step of:
    transmitting said credit information when requesting access to a service area type selected by said user for prepaid access.

12. A prepayment system for accessing services from a wireless telecommunication network comprising:
    a mobile terminal having preprogrammed subscriber credit information wherein said mobile terminal transmits said subscriber credit information to said wireless telecommunication network when said mobile terminal is located in a visiting service area; and
    a prepayment clearing house for verifying said transmitted subscriber credit information requested by said wireless telecommunication network, wherein prepayment access to said telecommunication network is permitted to said mobile terminal following a positive response from said clearing house regarding said subscriber credit information, and wherein access is denied to said mobile terminal following a negative response.

13. A prepayment system according to claim 10 wherein said credit information is obtained front said mobile terminal by wireless means in response to a control signal message.

14. A prepayment system according to claim 12 wherein said prepayment clearing house is a credit card verifying entity.

15. A prepayment system according to claim 12 wherein said mobile terminal is a roaming terminal requesting access to a visiting wireless telecommunication network.

16. A prepayment system according to claim 12 wherein said mobile terminal accesses services from its home service provider via said automated prepayment system.

17. A prepayment system according to claim 12 wherein said mobile terminal is operating within its home service area and requests access to a competing wireless telecommunication network covering substantially the same area as the home area.

18. The system of claim 12, further comprising:
    a user interface, associated with said mobile terminal, for selecting said at least one service area type.

19. The system of claim 18, wherein said at least are service area type includes at least one of a home service area and a visiting service area.

20. A mobile terminal for automatically transmitting subscriber credit information in order to obtain access to a wireless telecommunication network, said terminal comprising:
    memory for storing said subscriber credit information;
    transmission means for transmitting a registration message to said telecommunication network and for selectively transmitting said subscriber credit information when said mobile terminal is located in a visiting service area; and
    display means for displaying information on said mobile terminal.

21. A mobile terminal according to claim 20 wherein said credit information is entered into said memory via the member pad on the mobile terminal.

22. A mobile terminal according to claim 20 wherein said credit information is entered into said memory by wireless transmission means.

23. A mobile terminal according to claim 20 wherein said display means is capable of displaying an alpha numeric response message to an access request.

24. A mobile terminal according to claim 20 wherein said mobile terminal is capable of multi-band operation.

25. A mobile terminal according to claim 20 wherein said mobile terminal is capable of multi-standard operation thereby permitting access to a plurality of wireless telecommunication networks operating in accordance with different standards.

26. The mobile terminal of claim 20, further comprising:
user interface means for permitting a user of said mobile terminal to select at least one service area type for which said subscriber credit information may be transmitted.

27. The mobile terminal of claim 26, wherein said at least one service area type includes one of: a home service area and a visiting service area.

28. A method for prepaid access in a radio communication system comprising the steps of:

programming a mobile terminal with subscriber credit information;

transmitting a registration message from said mobile terminal to said radio communication system; said registration message selectively including an indicator which informs said system that this is a prepaid access request when said mobile, terminal is in a visiting service area;

transmitting from said radio communication system to said mobile terminal, a request for said programmed subscriber credit information;

transmitting, from said mobile terminal to said radio communication system, said programmed subscriber credit information; and selectively permitting said mobile terminal to access said radio communication system based on an evaluation of said subscriber credit information.

29. The method of claim 28, wherein said subscriber credit information includes a prepayment amount.

* * * * *